(12) United States Patent
Liu et al.

(10) Patent No.: US 11,762,905 B2
(45) Date of Patent: Sep. 19, 2023

(54) VIDEO QUALITY EVALUATION METHOD AND APPARATUS, DEVICE, AND STORAGE MEDIUM

(71) Applicant: BIGO TECHNOLOGY PTE. LTD., Singapore (SG)

(72) Inventors: Yun Liu, Guangzhou (CN); Huichuan Liu, Guangzhou (CN); Zhujin Liang, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 268 days.

(21) Appl. No.: 17/418,164

(22) PCT Filed: Dec. 4, 2019

(86) PCT No.: PCT/CN2019/123007
§ 371 (c)(1),
(2) Date: Jun. 24, 2021

(87) PCT Pub. No.: WO2020/134926
PCT Pub. Date: Jul. 2, 2020

(65) Prior Publication Data
US 2022/0101629 A1    Mar. 31, 2022

(30) Foreign Application Priority Data
Dec. 28, 2018  (CN) .......................... 201811627024.4

(51) Int. Cl.
*G06K 9/00*     (2022.01)
*G06F 16/783*   (2019.01)
(Continued)

(52) U.S. Cl.
CPC ............. *G06F 16/783* (2019.01); *G06N 3/08* (2013.01); *G06V 10/993* (2022.01); *G06V 20/40* (2022.01);
(Continued)

(58) Field of Classification Search
CPC ......... G06F 16/783; G06F 16/75; G06N 3/08; G06V 10/993; G06V 20/40; G06V 20/41;
(Continued)

(56) References Cited

U.S. PATENT DOCUMENTS 9,646,227 B2 *   5/2017  Suri .................... G06V 10/774
2006/0233442 A1* 10/2006  Lu ......................... G06T 7/0002
                                                        382/190

(Continued)

FOREIGN PATENT DOCUMENTS

CN   103458267 A    12/2013
CN   107222795 A     9/2017
(Continued)

OTHER PUBLICATIONS

Supplemental European Search Report Communication Pursuant to Rule 62 EPC, dated Jan. 11, 2022 in Patent Application No. EP 19904321.7, which is a foreign counterpart to this U.S. application.
(Continued)

*Primary Examiner* — Dhaval V Patel
(74) *Attorney, Agent, or Firm* — Kolitch Romano Dascenzo Gates LLP

(57) ABSTRACT

A video quality evaluation method comprises acquiring an image sequence and audio information by decoding a to-be-evaluated video, wherein the to-be-evaluated video is non-offending video; extracting an action feature vector and a face feature vector from the image sequence, and extracting an audio feature vector from the audio information; constructing a video feature vector according to at least one of the action feature vector, the face feature vector and the audio feature vector; and determining a quality score of the to-be-evaluated video according to the video feature vector.

19 Claims, 4 Drawing Sheets

(51) Int. Cl.
  *G06V 40/16*    (2022.01)
  *G06V 20/40*    (2022.01)
  *G06N 3/08*     (2023.01)
  *G06V 10/98*    (2022.01)

(52) U.S. Cl.
  CPC .............. *G06V 20/41* (2022.01); *G06V 20/46* (2022.01); *G06V 40/168* (2022.01)

(58) Field of Classification Search
  CPC .... G06V 20/46; G06V 40/168; G06V 40/161; G06V 40/20; G06T 2207/20084; G06T 7/0002; G06T 2207/30168; G06T 2207/30201; G06T 9/00; G06T 2207/10016; H04N 17/00; H04N 21/23418; H04N 21/2743; H04N 21/233
  See application file for complete search history.

(56) References Cited

U.S. PATENT DOCUMENTS

| | | | | |
|---|---|---|---|---|
| 2009/0153552 | A1* | 6/2009 | Fidaleo | G06Q 30/02 345/419 |
| 2016/0358628 | A1* | 12/2016 | Liu | G06V 20/47 |
| 2017/0024614 | A1* | 1/2017 | Sanil | G06F 16/70 |

FOREIGN PATENT DOCUMENTS

| | | | |
|---|---|---|---|
| CN | 107430780 | A | 12/2017 |
| CN | 107580259 | A | 1/2018 |
| CN | 107580260 | A | 1/2018 |
| CN | 107959849 | A | 4/2018 |
| CN | 108009754 | A | 5/2018 |
| CN | 108154304 | A | 6/2018 |
| CN | 108235075 | A | 6/2018 |
| CN | 108509457 | A | 9/2018 |
| CN | 108829881 | A | 11/2018 |
| CN | 109063163 | A | 12/2018 |
| CN | 109063587 | A | 12/2018 |
| CN | 109068158 | A | 12/2018 |
| WO | 2017074448 | A1 | 5/2017 |

OTHER PUBLICATIONS

Communication Pursuant to Article 94(3) EPC for EP Application No. 19904321.7 dated Jan. 21, 2022, which is a foreign counterpart to this U.S. application.
International Search Report of the International Searching Authority for State Intellectual Property Office of the People's Republic of China in PCT application No. PCT/CN2019/123007 dated Mar. 5, 2020, which is an International application corresponding to this U.S. application.
The State Intellectual Property Office of People's Republic of China, First Office Action in Patent Application No. CN201811627024.4 dated Aug. 18, 2020, which is a foreign counterpart application corresponding to this U.S. Patent Application, to which this application claims priority.
The State Intellectual Property Office of People's Republic of China, Second Office Action in Patent Application No. CN201811627024.4 dated Nov. 3, 2020, which is a foreign counterpart application corresponding to this U.S. Patent Application, to which this application claims priority.
Notification to Grant Patent Right for Invention of Chinese Application No. 201811627024.4 dated Jan. 11, 2021.
Wang, Weiming et al.; "Emotion Recognition Based on Feature Fusion of Facial Expressions and Body Movements" Video Engineering, vol. 42, No. 1; Jan. 5, 2018.

* cited by examiner

VIDEO QUALITY EVALUATION METHOD AND APPARATUS, DEVICE, AND STORAGE MEDIUM

This application is a US national stage of international application NO. PCT/CN2019/123007, filed on Dec. 4, 2019, which claims priority to Chinese Patent Application No. 201811627024.4 filed on Dec. 28, 2018 and entitled "VIDEO QUALITY EVALUATION METHOD, APPARATUS AND DEVICE, AND STORAGE MEDIUM". Both applications are herein incorporated by reference in their entireties.

TECHNICAL FIELD

Embodiments of this application relate to the field of video detection technologies, in particular relate to a video quality evaluation method and apparatus, a device, and a storage medium.

BACKGROUND

With the development of Internet technologies, short video applications (APP) are more and more widely used. Short video apps acquire a large quantity of short videos produced and uploaded by users every day. After offending videos are filtered out of these short videos, high-quality videos need to be selected from the remaining videos and pushed to viewers.

SUMMARY

This application provides a video quality evaluation method and apparatus, a device, and a storage medium, to improve timeliness of video quality evaluation and evaluation accuracy of a high-quality video.

An embodiment of this application provides a video quality evaluation method. The method includes:

acquiring an image sequence and audio information by decoding a to-be-evaluated video, wherein the to-be-evaluated video is non-offending video;

extracting an action feature vector and a face feature vector from the image sequence, and extracting an audio feature vector from the audio information;

constructing a video feature vector according to at least one of the action feature vector, the face feature vector and the audio feature vector;

inputting the video feature vector into a first-layer evaluation network, and acquiring, by the first-layer evaluation network, a primary feature vector through recursive and non-linear operations;

inputting the primary feature vector into a second-layer evaluation network, and acquiring, by the second-layer evaluation network, an advanced feature vector through recursive and non-linear operations; and acquiring a quality score of the to-be-evaluated video by performing, by an output layer, operations on the primary feature vector and the advanced feature vector;

wherein constructing the video feature vector according to at least one of the action feature vector, the face feature vector and the audio feature vector comprises:

setting the feature vector that fails to be extracted among the action feature vector, the face feature vector and the audio feature vector to zero; and constructing the video feature vector by combining the action feature vector, the face feature vector and the audio feature vector.

An embodiment of this application further provides a device, including:

one or more processors; and a memory storing at least one program therein, wherein the at least one program, when run by the at least one processor, causes the at least one processor to perform the video quality evaluation method according to any embodiment of this application.

An embodiment of this application further provides a non-transitory computer-readable storage medium storing a computer program, wherein the computer program, when run by a processing apparatus, causes the processing apparatus to perform the video quality evaluation method according to any embodiment of this application.

DETAILED DESCRIPTION

High-quality videos are videos that are potentially popular with viewers. A capability to accurately and comprehensively select high-quality videos from remaining videos after filtering out the offending videos or non-compliance videos to show to viewers determines key indicators of a short video app, such as a viewing duration, volume saved, and volume downloaded by a viewer of the short video app.

Two main types of quality video evaluation methods are commonly used in related technologies. One is to evaluate whether a video is of high quality based on external information of the video, that is, to evaluate quality of the video based on feedback data from viewers after the video is released. This method has a disadvantage of lacking timeliness because the quality of the video is evaluated only after the video is released and feedbacks from the viewers are collected. The other is to evaluate whether content of the video is of high quality based on some simple image parameters in the video. For example, a cover or key frame of the video is used to classify or cluster images to form some simple description information about the content of the video, and determine whether the video content is of high quality based on the description information. The disadvantage of this method is that the image parameters used are too simple to accurately and comprehensively describe the content of the video, and therefore the quality of the video cannot be accurately evaluated.

The following describes this application with reference to the accompanying drawings and embodiments. The specific embodiments described herein are merely intended to explain this application, rather than to limit this application. For ease of description, only some structures rather than all structures related to this application are shown in the accompany drawings.

Embodiment 1

Figure 1:
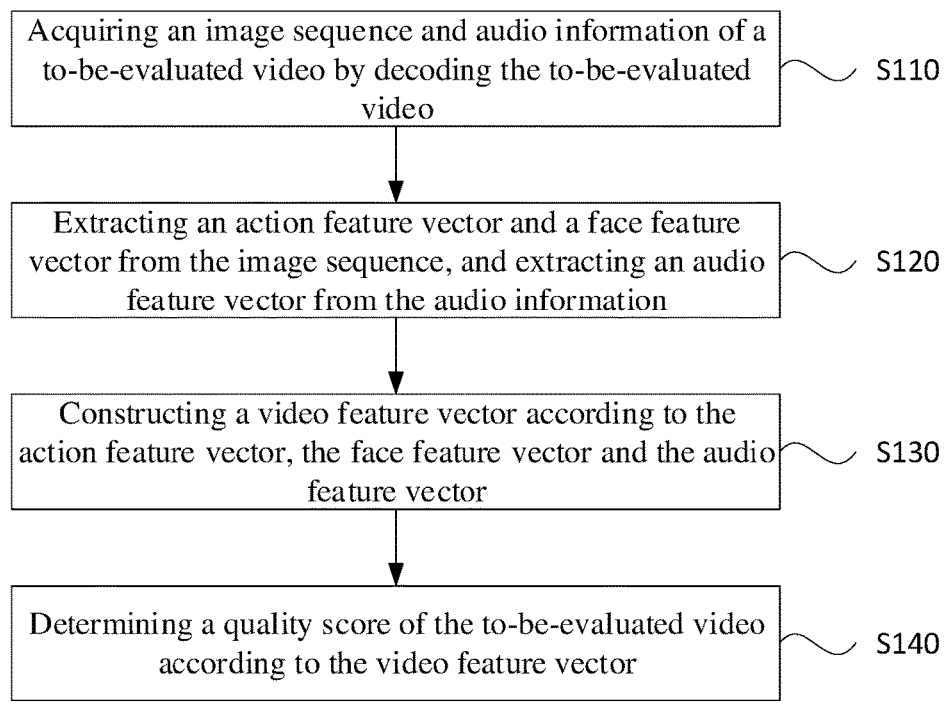
FIG. 1 is a flowchart of a video quality evaluation method according to Embodiment 1 of this application.

FIG. 1 is a flowchart of a video quality evaluation method according to Embodiment 1 of this application. This embodiment is applicable to a case of video quality evaluation. The method may be performed by a video quality evaluation apparatus, which may be implemented by hardware and/or software. The video quality evaluation apparatus may include a plurality of physical entities, or may include one physical entity. In an embodiment, the video quality evaluation apparatus is integrated in a computer device.

As shown in FIG. 1, the video quality evaluation method provided by this embodiment includes the following steps:

In S110, an image sequence and audio information of a to-be-evaluated video are acquired by decoding the to-be-evaluated video.

In this embodiment, a video server receives a large quantity of videos produced and uploaded by users every day. The video server needs to remove offending videos from all the videos uploaded by the users, and sifts out videos that viewers may like. Therefore, the videos uploaded by the users need to be detected and screened, and the videos are recommended to the viewers according to a screening result.

Figure 2:
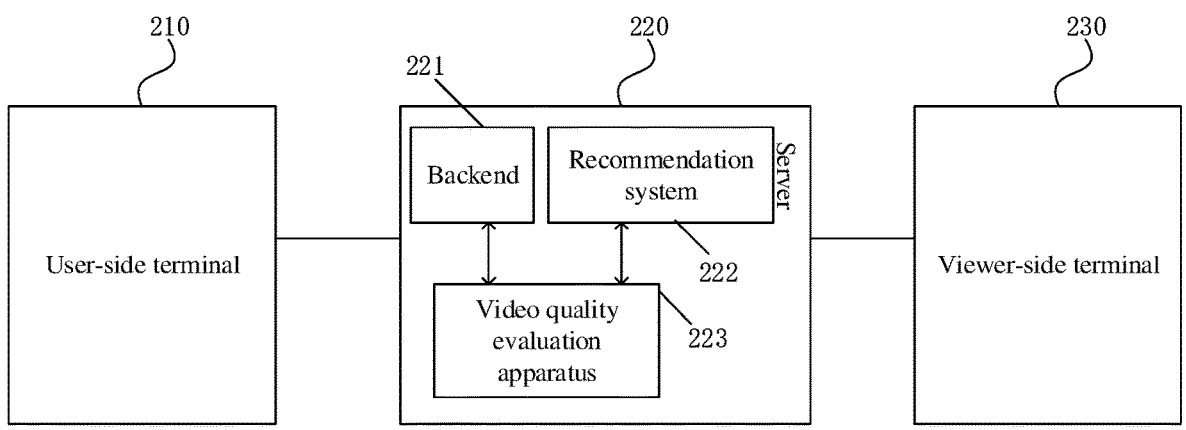
FIG. 2 is a schematic diagram of an application scenario of the video quality evaluation method according to Embodiment 1 of this application.

The video quality evaluation method according to this embodiment may be performed by the video quality evaluation apparatus. FIG. 2 is a schematic diagram of an application scenario of the video quality evaluation method according to Embodiment 1 of this application. As shown in FIG. 2, a user records a video through a user-side terminal 210 and uploads the video to a server 220. Then, a backend 221 or a recommendation system 222 in the server 220 invokes a video quality evaluation apparatus 223. The video quality evaluation apparatus 223 evaluates the video uploaded by the user, outputs an evaluation result, and returns the evaluation result to the backend 221 or the recommendation system 222. The backend 221 or the recommendation system 222 processes the video according to the evaluation result. In an embodiment, if the evaluation result is that the video is a high-quality video, the recommendation system 222 recommends the video to a viewer-side terminal 230. In an embodiment, the user-side terminal 210 and the viewer-sider terminal 230 may be a same terminal device, or may be two different terminal devices.

In this embodiment, the to-be-evaluated video is a video uploaded by the user to the video server and whose video quality is not known. To meet a data transmission requirement, the user needs to code the video before uploading the video. Coding refers to conversion of a video file in a format into a video file in another format through a specific compression technology. In an embodiment, the to-be-evaluated video at least includes video, audio and/or script. The to-be-evaluated video may be considered as a set of a plurality of images. The coded video needs to be decoded before evaluation of the to-be-evaluated video. The video may be considered to include a plurality of fast-playing images. Due to visual persistence of naked eyes, the picture is perceived as continuous. Therefore, decoding the video can acquire a plurality of frames of image data, and each frame of image data includes one image. After the video is decoded, an image sequence including a plurality of images arranged in a particular order may be acquired.

In this embodiment, after the to-be-evaluated video is decoded, audio information of the to-be-evaluated video may be further acquired. The audio information includes background music and language information of a character in the to-be-evaluated video.

In S120, an action feature vector and a face feature vector are extracted from the image sequence, and an audio feature vector is extracted from the audio information.

In this embodiment, the action feature vector refers to an action feature represented in a form of a vector. The action feature includes at least a character action and a surrounding environment in the to-be-evaluated video. For example, the character action is a dance movement, a sports movement, or the like of a character. The surrounding environment is a building, a high mountain, a bush, or the like. The action feature largely determines popularity of a video.

In this embodiment, a pose vector of each frame of image in the image sequence is extracted. One frame of image corresponds to one piece of matrix information. The corresponding pose vector may be acquired by merging the matrix information. The pose vector reflects image information corresponding to each frame of image. One image sequence may include a plurality of frames of images, and each frame of image corresponds to one pose vector. A plurality of acquired pose vectors are clustered, to convert the plurality of pose vectors into action feature vectors. A method for extracting the action feature vector is only described but not limited in this embodiment. Any method for extracting the action feature vector may be used according to actual needs.

In an embodiment, an action feature extraction network may be established in advance, and the action feature vector is acquired from the image sequence by extracting features from on each frame of image in the image sequence by using the action feature extraction network. In an embodiment, an action feature extraction network is acquired by fine-tuning an action recognition network. The image sequence is input into the action feature extraction network, and an action feature vector is acquired from the image sequence by extracting features from each frame of image by using the action feature extraction network. The action recognition network may include at least one type of network that has achieved a favorable effect in an action classification data set, including but not limited to C3D based on a three-dimensional (3D) convolutional network, an interactive three-dimensional (I3D) convolutional network, a temporal segment network (TSN) based on a two-stream (2-Stream) method of optical flow and space, and a plurality of action recognition networks based on a recurrent neural network (RNN).

The face feature vector is a vector used for describing a face feature. Extraction of a face feature vector refers to a process of acquiring a face feature vector in a face region based on face detection.

There are mainly two steps of extracting the face feature vector in this embodiment. First, face detection is performed on the image sequence, and then, features are extracted from the detected face information. In an embodiment, first, the face detection is performed on the acquired image sequence by a multi-task convolutional neural network (MTCNN) method, so as to acquire face detection data. Then, the face feature vector is acquired by extracting features from the face detection data by a FaceNet method. In this embodiment, the convolutional neural network is a major technology of deep learning, and the MTCNN method is a method for face detection. Face detection intends to determine whether a face appears in an image. FaceNet is a method, in which a face feature vector is acquired by mapping a face to a Euclidean feature space by using a convolutional neural network.

Background music or character voice in a video is also one of important contents in the video. Features of audio information of the background music or the character voice need to be extracted. Quality of the video is estimated according to the features of the audio information. After an audio signal is extracted from the video, some conventional audio signal processing methods need to be used to pre-process audio, to extract a spectrum or cepstrum feature of the audio, and then send the spectrum or cepstrum feature of the audio to the audio feature extraction network, to extract an audio feature vector that can be used for music recognition or character speech recognition.

The audio feature vector is a vector for describing sound information in a video. In an embodiment, extracting the audio feature vector from the audio information refers to extracting a component that reflect an essential feature of the audio information, such as a center frequency of the audio, or energy features of the audio in some frequency bands or energy distribution features of the audio over a plurality of periods of time, and combining such features to acquire the corresponding audio feature vector.

In S130, a video feature vector is constructed according to the action feature vector, the face feature vector and the audio feature vector.

In this embodiment, the video feature vector is a vector used for representing video quality. The video feature vector is a feature vector constructed according to the action feature vector, the face feature vector and the audio feature vector construct.

The video feature vector is acquired by combining the action feature vector, the face feature vector and the audio feature vector extracted in S120. In an embodiment, if only one type of feature vector is extracted from the to-be-evaluated video, other two feature vectors that fail to be extracted are set to 0, to form the video feature vector. For example, if only the action feature vector is extracted from the to-be-evaluated video, both the face feature vector and the audio feature vector are set to 0, to form the video feature vector. If only two types of feature vectors are extracted from the to-be-evaluated video, the other one feature vector that fails to be extracted is set to 0, to form the video feature vector. For example, if only the action feature vector and the face feature vector are extracted from the to-be-evaluated video, the audio feature vector is set to 0, to form the video feature vector.

In S140, a quality score of the to-be-evaluated video is determined according to the video feature vector.

In this embodiment, a video evaluation network is built and trained in advance, and the video feature vector is input into the video evaluation network. The video evaluation network outputs a score as the quality score of the to-be-evaluated video. In an embodiment, the video evaluation network may be a simple multilayer perceptron (MLP) or a relatively complex RNN network. In an embodiment, a high-quality video training data set is established, and corresponding features are extracted from the high-quality video training data set according to a manner in S120, and stored as training data of the video evaluation network.

In an embodiment, a case that there is no face in some videos needs to be considered during training of the video evaluation network. Therefore, during the training, face feature vectors need to be arbitrarily replaced with all zeros in the high-quality video set, as a data enhancement means, such that a trained network can be better adapted to actual data.

In the video quality evaluation method provided by this embodiment, an image sequence and audio information of a to-be-evaluated video is acquired by decoding the to-be-evaluated video; then an action feature vector and a face feature vector are extracted from the image sequence and an audio feature vector is extracted from the audio information; then a video feature vector is constructed according to the action feature vector, the face feature vector, and the audio feature vector; and finally, a quality score of the to-be-evaluated video is determined according to the video feature vector. According to this embodiment, the quality score of the to-be-evaluated video can be determined according to at least one extracted vector of the action feature vector, the face feature vector and the audio feature vector in the to-be-evaluated video, thereby improving timeliness of video quality evaluation and evaluation accuracy of a high-quality video.

Embodiment 2

Figure 3:
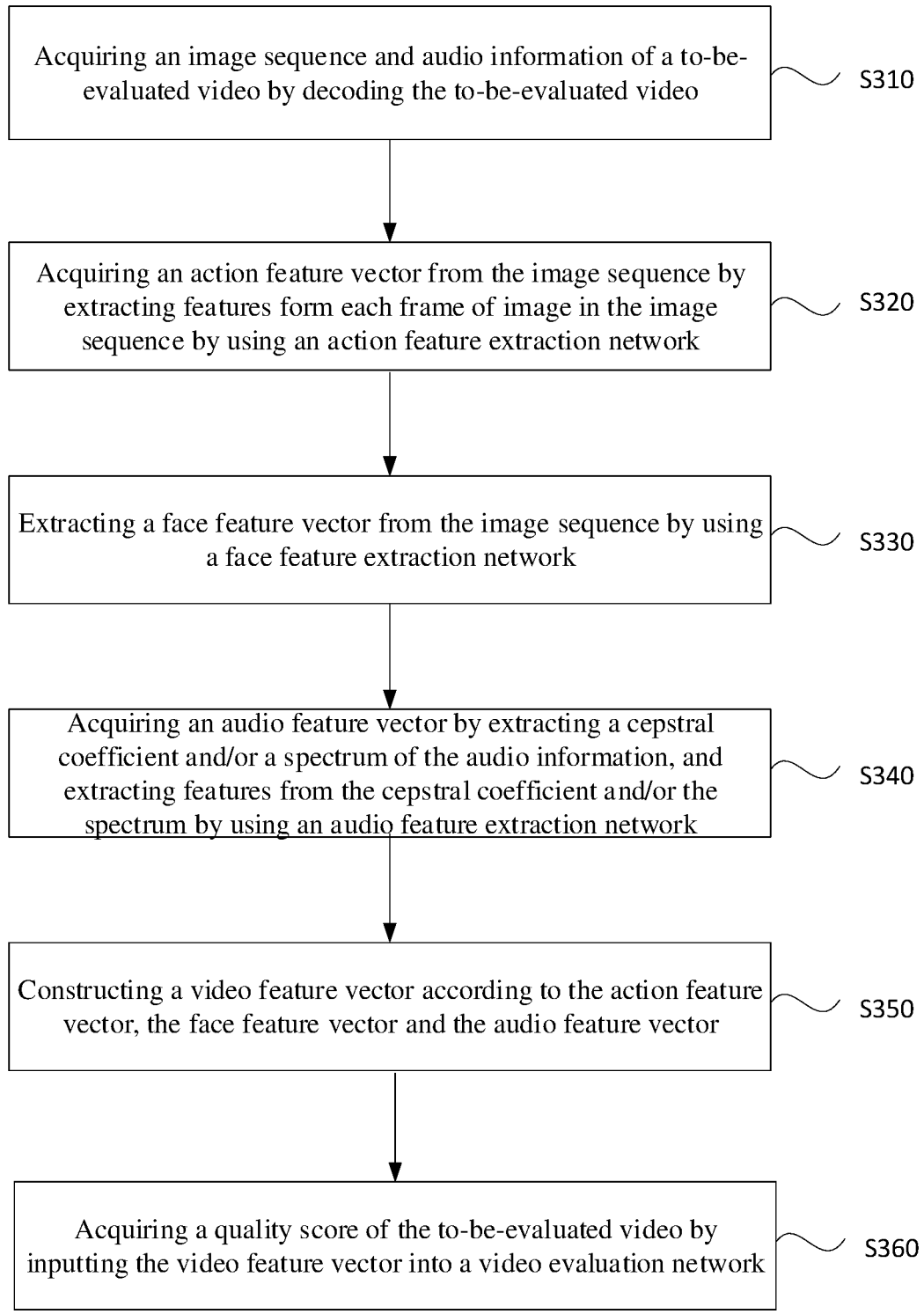
FIG. 3 is a flowchart of a video quality evaluation method according to Embodiment 2 of this application.

FIG. 3 is a flowchart of a video quality evaluation method according to Embodiment 2 of this application. This embodiment is applicable to a case of video quality evaluation. The video quality evaluation method in the foregoing embodiment is described in this embodiment. As shown in FIG. 3, the video quality evaluation method provided by this embodiment includes the following steps:

In S310, an image sequence and audio information of a to-be-evaluated video are acquired by decoding the to-be-evaluated video.

In S320, an action feature vector is acquired from the image sequence by extracting features from each frame of image in the image sequence by using an action feature extraction network.

In this embodiment, the action feature extraction network needs to be built and trained before extracting features from each frame of image by using the action feature extraction network. In an embodiment, the building and training the action feature extraction network mainly includes the following steps: acquiring a training video set, and extracting image sequences in each training video in the training video set; acquiring the action classification network by training in a video database; and acquiring the action feature extraction network by training the action classification network with the image sequences in each training video in the training video set and deleting a classification layer from the action classification network.

In an embodiment, the training video set is a high-quality video set acquired by a manual screening method. The more types and a larger quantity of high-quality videos are, the higher the accuracy of the action feature extraction network is and the more effective the video evaluation result is. First, the high-quality video set is acquired, and an image sequence corresponding to each high-quality video is acquired by decoding each high-quality video in the high-quality video set.

The action classification network is acquired by training in the video database based on a neural network. The neural network includes but is not limited to C3D based on a 3D convolutional network, an I3D convolutional network, a TSN based on a 2-stream method of an optical flow and space, and a plurality of action recognition networks based on an RNN. The video database includes but is not limited to Kinetics and YouTube-8 M data sets. Kinetics is a large public data set that is a data set with precise labeled actions. YouTube-8 M is also a large public data set that is a large video data set. The action classification network may be acquired by training by videos in the Kinetics data set or the YouTube-8 M data set. In this embodiment, a method for training the action classification network is not limited, and any model training method in the related technology can be used, so as to acquire the action classification network through training.

After the action classification network is acquired, the action classification network is fine-tuned with the image sequence extracted from each high-quality video in the high-quality video set, and the classification layer is deleted from the action classification network, so as to acquire the action feature extraction network.

In S330, a face feature vector is extracted from the image sequence by using a face feature extraction network.

In this embodiment, the face feature extraction network includes a face detection sub-network and a feature extraction sub-network. In an embodiment, extracting the face feature vector from the image sequence by using the face feature extraction network includes: detecting a face image in each frame of image in the image sequence by using the face detection sub-network; and acquiring the face feature vector from the image sequence by extracting features the face image in each frame of image in the image sequence by using the feature extraction sub-network.

In this embodiment, the face detection sub-network may be constructed by a common face detection network, for example, multi-task cascaded convolutional networks (MTCNN). In an embodiment, detecting a face image in each frame of image in the image sequence by using the face detection sub-network includes: first sifting out candidate face regions and corresponding candidate face region boarders in each frame of image by using a proposed network (P-Net) in the MTCNN network, and then merging highly overlapping candidate face region boarders by using a maximum suppression algorithm; then refining the candidate face regions by using a refining network (R-Net) in an MTCNN algorithm, so as to acquire a candidate face image, and deleting an incorrect candidate face region border by using a bounding box regression algorithm and a non-maximum suppression algorithm; and filtering the remaining candidate face region borders by using an output network (O-Net) in the MTCNN algorithm, and detecting a face from the candidate face image. In an embodiment, when there are a plurality of faces in the video, a face that is relatively large and close to the front of the image is selected.

In an embodiment, a public pre-trained face detection network may be directly used as the face detection sub-network, or a face detection network may be trained based on a high-quality video set, such that the face detection sub-network is more accurate in character recognition in a high-quality video.

The feature extraction sub-network may include a public pre-trained face recognition network, including but not limited to, FaceNet, InsightFace, or the like, or a network may be autonomously designed with reference to the principle of the feature extraction sub-network, and then a dedicated face recognition model is acquired through training based on the high-quality video data set. A plurality of face images of a same person are needed in a training process of the feature extraction sub-network and may be acquired from a selfie video uploaded by the same user. The trained feature extraction sub-network outputs highly similar feature vectors for different face images of a same person. The feature vector includes face appearance information of the person, which may be used to identify different persons, or may be used as a basis for estimating popularity of looks.

This embodiment provides a feature extraction sub-network training method. The method includes the following steps: acquiring a training video set, and extracting face images in each training video in the training video set; acquiring a face recognition network by training in a face database; and acquiring the feature extraction sub-network by training the face recognition network using the face images in each training video in the training video set. The training video set is a high-quality video set acquired by a manual screening method.

In S340, a cepstral coefficient and/or a spectrum of the audio information is extracted, and an audio feature vector is acquired by extracting features from the cepstral coefficient and/or the spectrum by using an audio feature extraction network.

Music or character voice in a video is also one of important contents in the video. A feature vector of a sound of the music or the character voice needs to be extracted by using the audio feature extraction network, so as to estimate the quality of the video according to the feature vector of the sound.

In this embodiment, the cepstral coefficient is a mel-frequency cepstral coefficient (MFCC). The mel-frequency is proposed based on human hearing features, and the mel-frequency and a hertz (Hz) frequency have a non-linear correspondence. The MFCC coefficient is a frequency feature acquired through calculation based on the relationship between the mel-frequency and the Hz frequency. In this embodiment, the method for extracting the cepstral coefficient of the audio information is not limited, and any method can be used to extract the cepstral coefficient of the audio information.

In an embodiment, the spectrum refers to analysis of a frequency-related part rather than a time-related part in the audio information during analysis of the audio information. Extracting the spectrum of the audio information is extracting the frequency-related part in the audio information. In this embodiment, the method for extracting the spectrum of the audio information is not limited, and any method can be used to extract the spectrum of the audio information. In this embodiment, any one of the cepstral coefficient or the spectrum of the audio information may be extracted, or both the cepstral coefficient and the spectrum of the audio information may be extracted.

In an embodiment, prior to extracting the cepstral coefficient and/or the spectrum of the audio information, the following is further included: after an audio signal is extracted from the video, audio needs to be pre-processed first by using some conventional audio signal processing methods. In an embodiment of Embodiment 1, pre-processing at least includes noise reduction, gain, data normalization, and other processing. Pre-processing the audio information can improve accuracy of audio recognition. An algorithm used for audio pre-processing needs to be determined according to a requirement of a pre-trained data set, and remain consistent during training and prediction.

In this embodiment, after the cepstral coefficient and/or the spectrum of the audio information is extracted, the audio feature vector is acquired by extracting features from the cepstral coefficient and/or the spectrum by using the audio feature extraction network.

In this embodiment, a method for training an audio feature extraction network is provided. The method for training an audio feature extraction network includes: acquiring a training video set, and extracting the audio information in each training video in the training video set; acquiring an audio recognition network by training in an audio database; and acquiring the audio feature extraction network by training the audio recognition network using the audio information in each training video in the training video set. In an embodiment, the audio feature extraction network may be any network based on a convolutional neural network (Convolutional Neural Networks, CNN) or an RNN. An audio recognition network is pre-trained based on a public data set used for music recognition or character speech recognition, and then the audio feature extraction network is acquired by fine-tuning the audio recognition network based on a high-quality video training set.

The three steps S320, S330, and S340 may be performed in any order, and the order in which the three steps are performed is not limited in this embodiment.

In S350, a video feature vector is constructed according to the action feature vector, the face feature vector, and the audio feature vector.

In S360, a quality score of the to-be-evaluated video is acquired by inputting the video feature vector into a video evaluation network.

In this embodiment, the video evaluation network may be a simple multilayer perceptron or a relatively complex RNN network. An input of the video evaluation network is a video feature vector, and an output is a score indicating quality of a video. In an embodiment, if the output score is greater than 0 points, the actual output score is used as the quality score of the to-be-evaluated video. If the output score is less than 0 points, 0 points are used as the quality score of the to-be-evaluated video.

In an embodiment, the video evaluation network includes a first-layer evaluation network, a second-layer evaluation network, and an output layer.

Acquiring the quality score of the to-be-evaluated video by inputting the video feature vector into the video evaluation network includes: inputting the video feature vector into the first-layer evaluation network, and acquiring, by the first-layer evaluation network, a primary feature vector through recursive and non-linear operations; inputting, by the first-layer evaluation network, the primary feature vector into the second-layer evaluation network, and acquiring, by the second-layer evaluation network, an advanced feature vector through recursive and non-linear operations and inputting the advanced feature vector into the output layer; and acquiring the quality score of the to-be-evaluated video by performing, by the output layer, operations on the primary feature vector and the advanced feature vector. In an embodiment, a case that there is no face in some videos needs to be considered during training of the video evaluation network. Therefore, during the training, face features need to be arbitrarily replaced with all zeros in the high-quality video set, as a data enhancement means, such that a trained model can be better adapted to actual data.

Based on the foregoing embodiment, S320 may be replaced by the following: extracting optical flow data of each frame of image in the image sequence; and acquiring the action feature vector from the image sequence by extracting features from the optical flow data of each frame of image in the image sequence by using an action feature extraction network.

In the video quality evaluation method provided by this embodiment, an image sequence and audio information of a to-be-evaluated video are first acquired by decoding the to-be-evaluated video; then an action feature vector is acquired from the image sequence by extracting features from each frame of image in the image sequence by using an action feature extraction network; a face feature vector is extracted from the image sequence by using a face feature extraction network; an audio feature vector is acquired by extracting features from a cepstral coefficient and/or a spectrum of the audio information by using an audio feature extraction network; then a video feature vector is constructed according to the action feature vector, the face feature vector, and the audio feature vector; and finally, a quality score of the to-be-evaluated video is determined according to the video feature vector. According to this embodiment, the quality score of the to-be-evaluated video can be determined according to at least one extracted vector of the action feature vector, the face feature vector, and the audio feature vector in the to-be-evaluated video, thereby improving timeliness of video quality evaluation and evaluation accuracy of a high-quality video.

Embodiment 3

Figure 4:
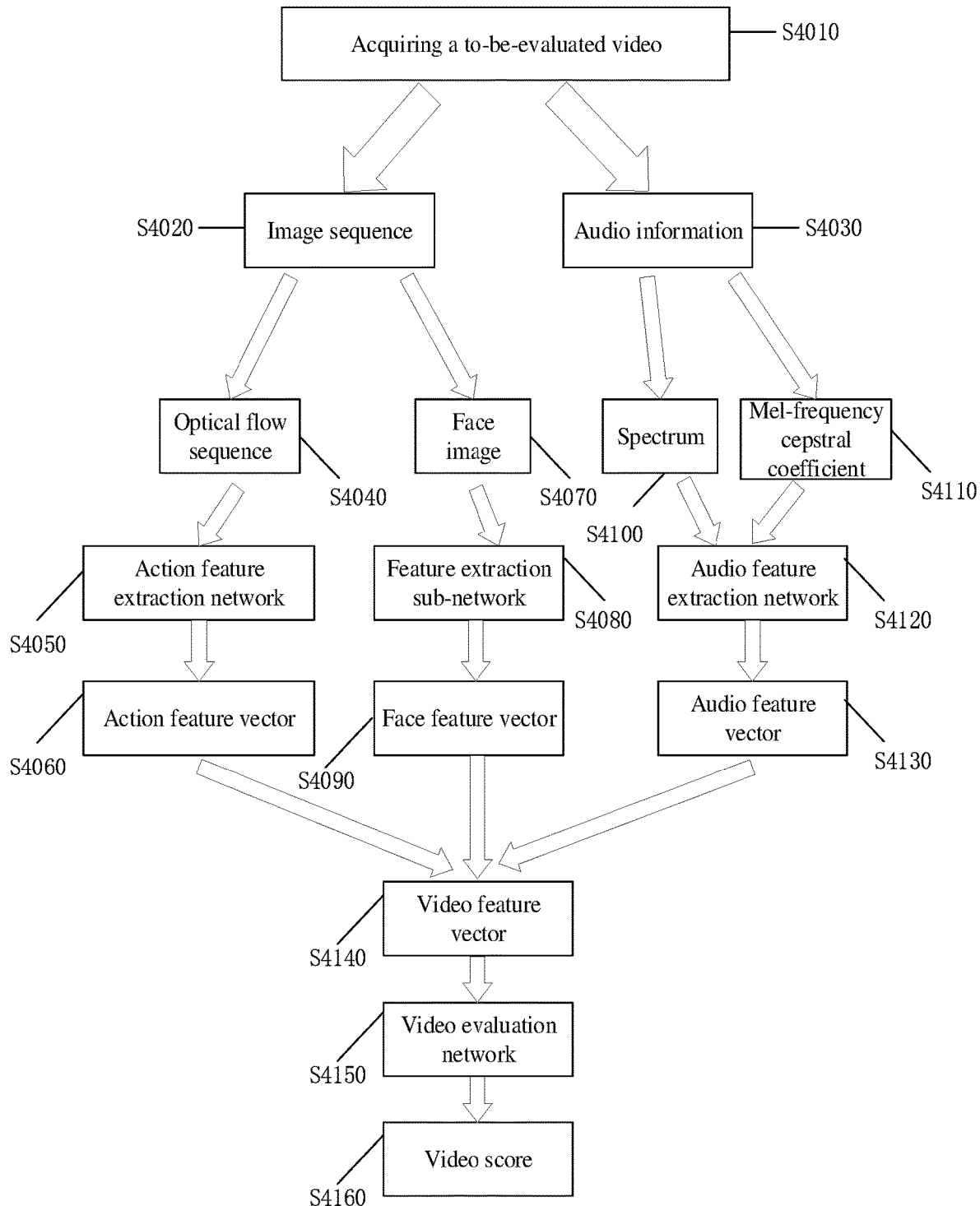
FIG. 4 is a flowchart of a video quality evaluation method according to Embodiment 3 of this application.

Based on the foregoing embodiment, this embodiment provides an instance. FIG. 4 is a flowchart of a video quality evaluation method according to Embodiment 3 of this application. As shown in FIG. 4, the video quality evaluation method includes the following steps:

In S4010, a to-be-evaluated video is acquired. The to-be-evaluated video may be a video that a user has just recorded and uploaded to a server, or may be a video stored in a server and on which quality evaluation has not been performed. In an embodiment, the to-be-evaluated video in this embodiment is a short video recorded by a user.

In S4020, the to-be-evaluated video is decoded, such that an image sequence including a plurality of images arranged in a particular order may be acquired.

In S4030, after the to-be-evaluated video is decoded, audio information of the to-be-evaluated video may be acquired. The audio information includes background music and language information of a character in the to-be-evaluated video.

S4020 and S4030 may be performed in sequence or in a reverse order, that is, S4030 may be performed after S4020, or S4020 may be performed after S4030. In an embodiment, S4020 and S4030 may be performed at the same time. In this embodiment, an order in which S4020 and S4030 are performed is not limited.

In S4040, an optical flow sequence is acquired by extracting optical flow data of each frame of image in the image sequence.

In S4050, the image sequence acquired through decoding in S4020 or the optical flow sequence acquired S4040 is input into an action feature extraction network.

In S4060, the action feature extraction network outputs an action feature vector. The action feature vector is a vector of an action feature represented in a form of a vector. The action feature includes at least a character action and a surrounding environment in the to-be-evaluated video. For example, the character action is a dance movement, a sports movement, or the like of a character. The surrounding environment is a building, a high mountain, a bush, or the like. The action feature largely determines popularity of a video.

In S4070, a face image is acquired by performing, by using a face detection sub-network, face detection, on the image sequence acquired through extraction in S4020. A public pre-trained face detection network may be directly used as the face detection sub-network, or a face detection network may be trained based on a high-quality video set, such that the face detection sub-network is more accurate in character recognition in a high-quality video.

In S4080, the face image acquired in S4070 is input into a feature extraction sub-network. The feature extraction sub-network may include a public pre-trained face recognition network, including but not limited to, FaceNet, Insight-Face, or the like, or a network may be autonomously designed with reference to the principle of the feature extraction sub-network, and then a dedicated face recognition model is acquired through training based on the high-quality video data set.

In S4090, the feature extraction sub-network outputs a face feature vector. The trained feature extraction sub-network outputs highly similar feature vectors for different face images of a same person. The feature vector includes face appearance information of the person, which may be used to identify different persons, or may be used as a basis for estimating popularity of looks.

In S4100, after the audio information acquired by decoding in S4030 is pre-processed, spectrum in the audio information is extracted.

In S4110, after the audio information acquired by decoding in S4030 is pre-processed, a mel-frequency cepstral coefficient in the audio information is extracted.

Background music or character voice in a video is also one of important contents in the video. Features of audio information of the background music or the character voice need to be extracted. Quality of the video is estimated according to the features of the audio information.

In S4120, the spectrum acquired in S4100 and the mel-frequency cepstral coefficient acquired in S4110 are input into an audio feature extraction network. The audio feature extraction network may be any network based on a CNN or an RNN. An audio recognition network is pre-trained based on a public data set used for music recognition or character speech recognition, and then the audio recognition network is fine-tuned based on a high-quality video training set, to acquire the audio feature extraction network.

In S4130, the audio feature extraction network outputs an audio feature vector. The audio feature vector is a vector for describing sound information in a video.

In S4140, a video feature vector is constructed according to the action feature vector, the face feature vector, and the audio feature vector.

In S4150, the video feature vector is input into a video evaluation network. The video evaluation network may be a simple multilayer perceptron or a relatively complex RNN network. An input of the video evaluation network is a video feature vector, and an output is a score indicating quality of a video.

In S4160, the video evaluation network outputs a video score. The video score is used for measuring quality of a video. A higher score indicates higher quality of the video.

Based on the foregoing embodiment, this embodiment provides an instance. A user uploads a one-minute short video through a short video application. In an embodiment, the short video is a video of a character A dancing, and background music is music B. It is assumed that the short video includes 24 frames per second. In this case, the one-minute short video is decoded, and 1440 frames of image data and one-minute audio information may be acquired. Each frame of image data includes one image, that is, an image sequence including 1440 continuous images may be acquired. The image sequence including the 1440 images is input into the action feature extraction network and the face feature extraction network. The action feature extraction network outputs an action feature vector for representing a dance movement of the character A in the video. The face feature extraction network outputs a face feature vector for representing face appearance information of the character A in the video. The audio information is input into the audio feature extraction network, and the audio feature extraction network outputs an audio feature vector. For example, the action feature vector is a vector of three rows and five columns, the face feature vector is a vector of five row and eight columns, and the audio feature vector is a vector of four rows and nine columns. A video feature vector is constructed according to at least one of the action feature vector, the face feature vector and the audio feature vector. A video feature vector of five rows and 22 columns may be acquired. The video feature vector is input into the video evaluation network. The video evaluation network outputs a score. For example, the score may be 95 points.

In the video quality evaluation method provided by this embodiment, an image sequence and audio information of a to-be-evaluated video is acquired by decoding the to-be-evaluated video; then an action feature vector and a face feature vector are extracted from the image sequence and an audio feature vector is extracted from the audio information; then a video feature vector is constructed according to the action feature vector, the face feature vector, and the audio feature vector; and finally, a quality score of the to-be-evaluated video is determined according to the video feature vector. According to this embodiment, the quality score of the to-be-evaluated video can be determined according to at least one extracted vector of the action feature vector, the face feature vector and the audio feature vector in the to-be-evaluated video, thereby improving timeliness of video quality evaluation and evaluation accuracy of a high-quality video.

Embodiment 4

Figure 5:
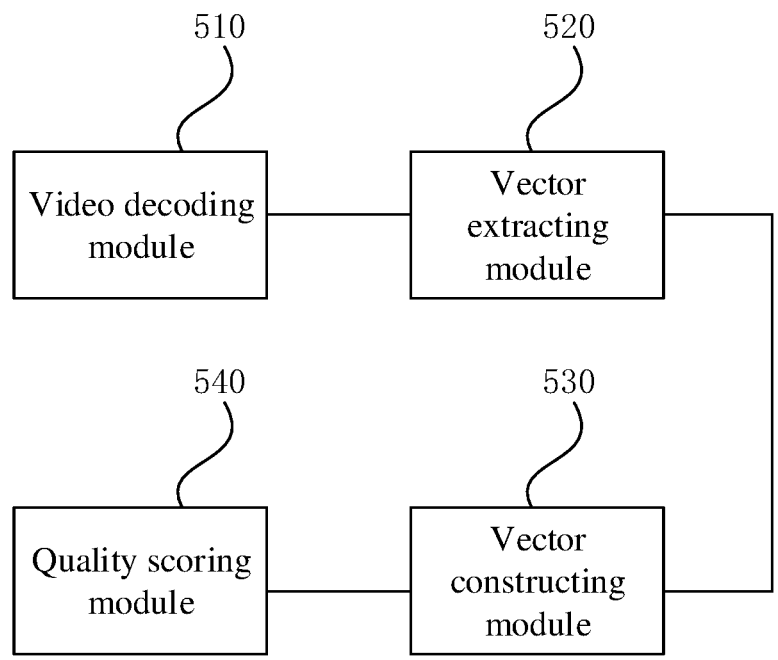
FIG. 5 is a schematic structural diagram of a video quality evaluation apparatus according to Embodiment 4 of this application.

FIG. 5 is a schematic structural diagram of a video quality evaluation apparatus according to Embodiment 4 of this application. This embodiment is applicable to a case of video quality evaluation. The video quality evaluation apparatus may be implemented by software and/or hardware. The video quality evaluation apparatus is set to be integrated in a terminal device. A structure of the video quality evaluation apparatus includes the following: a video decoding module 510, configured to acquire an image sequence and audio information of a to-be-evaluated video by decoding the to-be-evaluated video; a vector extracting module 520, configured to extract an action feature vector and a face feature vector from the image sequence, and extract an audio feature vector from the audio information; a vector constructing module 530, configured to construct a video feature vector according to the action feature vector, the face feature vector, and the audio feature vector; and a quality scoring module 540, configured to determine a quality score of the to-be-evaluated video according to the video feature vector.

In the video quality evaluation apparatus provided by this embodiment, an image sequence and audio information of a to-be-evaluated video is acquired by decoding the to-be-evaluated video; then an action feature vector and a face feature vector are extracted from the image sequence and an audio feature vector is extracted from the audio information; then a video feature vector is constructed according to the action feature vector, the face feature vector, and the audio feature vector; and finally, a quality score of the to-be-evaluated video is determined according to the video feature vector. According to this embodiment, the quality score of the to-be-evaluated video can be determined according to at least one extracted vector of the action feature vector, the face feature vector and the audio feature vector in the to-be-evaluated video, thereby improving timeliness of video quality evaluation and evaluation accuracy of a high-quality video.

Embodiment 5

Figure 6:
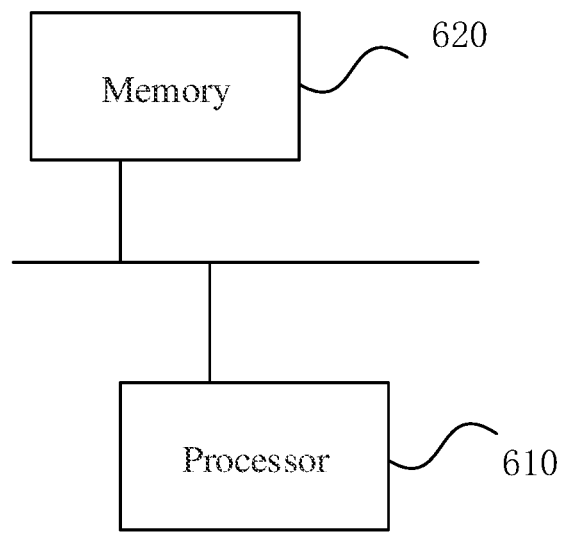
FIG. 6 is a schematic structural diagram of a device according to Embodiment 5 of this application.

FIG. 6 is a schematic structural diagram of a device according to Embodiment 5 of this application. As shown in FIG. 6, the device includes a processor 610 and a memory 620. There may be one or more processors 610 in the device, and in FIG. 6, for example, there is one processor 610. The processor 610 and the memory 620 in the device may be connected through a bus or in another manner, and in FIG. 6, for example, the connection is implemented through a bus.

As a computer-readable storage medium, the memory 620 may be configured to store software programs, computer executable programs, and modules, such as program instructions/modules (for example, the video decoding module 510, the vector extracting module 520, the vector constructing module 530, and the quality scoring module 540 in the video quality evaluation apparatus) corresponding to the video quality evaluation method in the embodiments of this application. The processor 610 runs the software programs, instructions, and modules stored in the memory 620, to perform various functional applications of the device and data processing, that is, to implement the video quality evaluation method described above.

Embodiment 6

Embodiment 6 further provides a non-transitory computer-readable storage medium including computer executable instructions. The computer executable instructions, when run by a computer processor, causes the processing apparatus to perform a video quality evaluation method. The method includes: acquiring an image sequence and audio information of a to-be-evaluated video by decoding the to-be-evaluated video; extracting an action feature vector and a face feature vector from the image sequence, and extracting an audio feature vector from the audio information; constructing a video feature vector according to the action feature vector, the face feature vector and the audio feature vector; and determining a quality score of the to-be-evaluated video according to the video feature vector.

In the storage medium including computer executable instructions according to this embodiment of this application, in addition to performing the foregoing method operations, the computer executable instructions can also be used to perform related operations in the video quality evaluation method according to any embodiment of this application.

What is claimed is:

1. A video quality evaluation method, comprising:
acquiring an image sequence and audio information by decoding a to-be-evaluated video, wherein the to-be-evaluated video is a non-offending video;
extracting an action feature vector and a face feature vector from the image sequence, and extracting an audio feature vector from the audio information;
constructing a video feature vector according to at least one of the action feature vector, the face feature vector and the audio feature vector;
inputting the video feature vector into a first-layer evaluation network, and acquiring, by the first-layer evaluation network, a primary feature vector through recursive and non-linear operations;
inputting the primary feature vector into a second-layer evaluation network, and acquiring, by the second-layer evaluation network, an advanced feature vector through recursive and non-linear operations; and
acquiring a quality score of the to-be-evaluated video by performing, by an output layer, operations on the primary feature vector and the advanced feature vector,
wherein constructing the video feature vector according to at least one of the action feature vector, the face feature vector and the audio feature vector comprises:
setting the feature vector that fails to be extracted among the action feature vector, the face feature vector and the audio feature vector to zero; and
constructing the video feature vector by combining the action feature vector, the face feature vector and the audio feature vector.

2. The method according to claim 1, wherein extracting the action feature vector from the image sequence comprises:
acquiring the action feature vector by extracting features from each frame of image by using an action feature extraction network;
and/or
extracting optical flow data of each frame of image, and acquiring the action feature vector by extracting features from the optical flow data of each frame of image by using an action feature extraction network.

3. The method according to claim 2, further comprising:
acquiring a training video set, and extracting image sequences in each training video;
acquiring an action classification network by training in a video database; and
acquiring the action feature extraction network by training the action classification network with the image sequences in each training video and deleting a classification layer from the action classification network.

4. The method according to claim 1, wherein extracting the face feature vector from the image sequence comprises:
extracting the face feature vector from the image sequence by using a face feature extraction network.

5. The method according to claim 4, wherein the face feature extraction network comprises a face detection sub-network and a feature extraction sub-network.

6. The method according to claim 5, wherein extracting the face feature vector from the image sequence by using the face feature extraction network comprises:
detecting a face image in each frame of image in the image sequence by using the face detection sub-network; and
acquiring the face feature vector by extracting features the face image in each frame of image by using the feature extraction sub-network.

7. The method according to claim 6, further comprising:
acquiring a training video set, and extracting face images in each training video;
acquiring a face recognition network by training in a face database; and
acquiring the feature extraction sub-network by training the face recognition network using the face images in each training video.

8. The method according to claim 1, wherein extracting the audio feature vector from the audio information comprises:
extracting at least one of a cepstral coefficient and a spectrum of the audio information; and acquiring the audio feature vector by extracting features from at least one of the cepstral coefficient and the spectrum by using an audio feature extraction network.

9. The method according to claim 8, further comprising:
acquiring a training video set, and extracting the audio information in each training video;
acquiring an audio recognition network by training in an audio database; and
acquiring the audio feature extraction network by training the audio recognition network using the audio information in each training video.

10. A device, comprising:
at least one processor; and
a memory storing at least one program therein, wherein the at least one program, when run by the at least one processor, causes the at least one processor to perform a video quality evaluation method, comprising:
acquiring an image sequence and audio information by decoding a to-be-evaluated video, wherein the to-be-evaluated video is a short video recorded by a user of a short video application;
extracting an action feature vector and a face feature vector from the image sequence, and extracting an audio feature vector from the audio information;
constructing a video feature vector according to at least one of the action feature vector, the face feature vector and the audio feature vector;
inputting the video feature vector into a first-layer evaluation network, and acquiring, by the first-layer evaluation network, a primary feature vector through recursive and non-linear operations;
inputting the primary feature vector into a second-layer evaluation network, and acquiring, by the second-layer evaluation network, an advanced feature vector through recursive and non-linear operations; and
acquiring a quality score of the to-be-evaluated video by performing, by an output layer, operations on the primary feature vector and the advanced feature vector,
wherein constructing the video feature vector according to at least one of the action feature vector, the face feature vector and the audio feature vector comprises:
setting the action feature vector, the face feature vector, or the audio feature vector to zero in response its failed extraction; and
constructing the video feature vector by combining the action feature vector, the face feature vector and the audio feature vector.

11. A non-transitory computer-readable storage medium storing a computer program, wherein the computer program, when run by a processing apparatus, causes the processing apparatus to perform a video quality evaluation method, comprising:
acquiring an image sequence and audio information by decoding a to-be-evaluated video, wherein the to-be-evaluated video is a non-offending video;
extracting an action feature vector and a face feature vector from the image sequence, and extracting an audio feature vector from the audio information;
constructing a video feature vector according to at least one of the action feature vector, the face feature vector and the audio feature vector;
inputting the video feature vector into a first-layer evaluation network, and acquiring, by the first-layer evaluation network, a primary feature vector through recursive and non-linear operations;
inputting the primary feature vector into a second-layer evaluation network, and acquiring, by the second-layer evaluation network, an advanced feature vector through recursive and non-linear operations; and
acquiring a quality score of the to-be-evaluated video by performing, by an output layer, operations on the primary feature vector and the advanced feature vector,
wherein constructing the video feature vector according to at least one of the action feature vector, the face feature vector and the audio feature vector comprises:
setting the feature vector that fails to be extracted among the action feature vector, the face feature vector and the audio feature vector to zero; and
constructing the video feature vector by combining the action feature vector, the face feature vector and the audio feature vector.

12. The device according to claim 10, wherein extracting the action feature vector from the image sequence comprises:
acquiring the action feature vector by extracting features from each frame of image by using an action feature extraction network;
and/or
extracting optical flow data of each frame of image; and
acquiring the action feature vector by extracting features from the optical flow data of each frame of image by using an action feature extraction network.

13. The device according to claim 12, wherein the method further comprises:
acquiring a training video set, and extracting image sequences in each training video;
acquiring an action classification network by training in a video database; and
acquiring the action feature extraction network by training the action classification network with the image sequences in each training video and deleting a classification layer from the action classification network.

14. The device according to claim 10, wherein extracting the face feature vector from the image sequence comprises:
extracting the face feature vector from the image sequence by using a face feature extraction network.

15. The device according to claim 14, wherein the face feature extraction network comprises a face detection sub-network and a feature extraction sub-network.

16. The device according to claim 15, wherein extracting the face feature vector from the image sequence by using the face feature extraction network comprises:
detecting a face image in each frame of image in the image sequence by using the face detection sub-network; and
acquiring the face feature vector by extracting features the face image in each frame of image by using the feature extraction sub-network.

17. The device according to claim 16, wherein the method further comprises:
acquiring a training video set, and extracting face images in each training video;
acquiring a face recognition network by training in a face database; and
acquiring the feature extraction sub-network by training the face recognition network using the face images in each training video.

18. The device according to claim 10, wherein extracting the audio feature vector from the audio information comprises:
extracting at least one of a cepstral coefficient and a spectrum of the audio information; and acquiring the audio feature vector by extracting features from at least one of the cepstral coefficient and the spectrum by using an audio feature extraction network.

19. The device according to claim 18, wherein the method further comprises:
    acquiring a training video set, and extracting the audio information in each training video;
    acquiring an audio recognition network by training in an audio database; and
    acquiring the audio feature extraction network by training the audio recognition network using the audio information in each training video.

* * * * *